United States Patent
Partheniou et al.

(10) Patent No.: US 10,820,220 B2
(45) Date of Patent: *Oct. 27, 2020

(54) MOBILE DEVICE PROTOCOL HEALTH MONITORING SYSTEM

(71) Applicant: Geotab Inc., Oakville (CA)

(72) Inventors: Anthonios Partheniou, Oakville (CA); Paul Philip Ciolek, Oakville (CA)

(73) Assignee: Geotab Inc., Oakville (CA)

( * ) Notice: Subject to any disclaimer, the term of this patent is extended or adjusted under 35 U.S.C. 154(b) by 12 days.

This patent is subject to a terminal disclaimer.

(21) Appl. No.: 16/030,492

(22) Filed: Jul. 9, 2018

(65) Prior Publication Data

US 2018/0324612 A1  Nov. 8, 2018

Related U.S. Application Data

(63) Continuation of application No. 14/544,655, filed on Jan. 30, 2015, now Pat. No. 10,098,025.

(51) Int. Cl.
*H04W 24/08* (2009.01)
*H04L 12/26* (2006.01)
*H04L 12/24* (2006.01)
*H04L 12/40* (2006.01)

(52) U.S. Cl.
CPC ......... *H04W 24/08* (2013.01); *H04L 41/0604* (2013.01); *H04L 43/0817* (2013.01); *H04L 43/0894* (2013.01); *H04L 43/16* (2013.01); *H04L 43/0823* (2013.01); *H04L 2012/40215* (2013.01); *H04L 2012/40273* (2013.01)

(58) Field of Classification Search
CPC . H04W 24/08; H04L 43/0817; H04L 41/0604
See application file for complete search history.

(56) References Cited

U.S. PATENT DOCUMENTS

| | | |
|---|---|---|
| 6,795,941 B2 | 9/2004 | Nickels |
| 8,213,321 B2 | 7/2012 | Butts et al. |
| 8,799,738 B2 | 8/2014 | Emde et al. |
| 2008/0186870 A1* | 8/2008 | Butts .................. H04L 41/0659 370/252 |
| 2010/0082805 A1 | 4/2010 | Orton et al. |

(Continued)

OTHER PUBLICATIONS

U.S. Appl. No. 14/544,655, filed Jan. 30, 2015, Partheniou et al.

*Primary Examiner* — Kodzovi Acolatse
*Assistant Examiner* — Farhad Ali
(74) *Attorney, Agent, or Firm* — Wolf, Greenfield & Sacks, P.C.

(57) ABSTRACT

A method and apparatus for use in a mobile device telemetry system is disclosed. The method and apparatus relate to aspects in a mobile device protocol health monitoring system. The method and apparatus provide a system to monitor and assess protocol health, log protocol health data and communicate the logs of protocol health data to a remote system. The system may also take corrective actions based upon specific indications of protocol health. The method and apparatus also provides protocol health indications and corrective actions based upon monitoring the message transmission rate. The method and apparatus also provides protocol health indications and corrective actions based upon monitoring for a line disconnect.

44 Claims, 8 Drawing Sheets

(56) References Cited

U.S. PATENT DOCUMENTS

| | | | | |
|---|---|---|---|---|
| 2010/0274893 A1* | 10/2010 | Abdelal | ............. | H04L 29/0602 |
| | | | | 709/224 |
| 2012/0173900 A1* | 7/2012 | Diab | ...................... | H04L 12/10 |
| | | | | 713/310 |
| 2015/0082096 A1* | 3/2015 | Jiang | ................... | G06F 11/3006 |
| | | | | 714/37 |
| 2015/0312123 A1 | 10/2015 | Zhang et al. | | |
| 2016/0227422 A1 | 8/2016 | Partheniou et al. | | |

* cited by examiner

MOBILE DEVICE PROTOCOL HEALTH MONITORING SYSTEM

CROSS REFERENCE TO RELATED APPLICATIONS

This application claims the benefit under 35 U.S.C. § 120 as a continuation of U.S. application Ser. No. 14/544,655, entitled "MOBILE DEVICE PROTOCOL HEALTH MONITORING SYSTEM," filed Jan. 30, 2015, the entire contents of which is incorporated herein by reference.

TECHNICAL FIELD OF THE INVENTION

The present invention generally relates to a method and apparatus for monitoring the protocol health of a communication messaging system. More specifically, the present invention relates to monitoring the protocol health of a mobile device network associated with a mobile device such as a vehicle.

BACKGROUND OF THE INVENTION

Monitoring systems with capabilities to monitor the protocol health of mobile device networks, for example vehicle networks, are known in the prior art. Monitoring systems that provide useful protocol health information are also known in the prior art.

U.S. Pat. No. 8,213,321 B2 issued on Jul. 3, 2012 to Butts and Anderson and is assigned to Deere & Company. This patent relates to a method and system to monitor a communications network such as a controller area network (CAN) and more specifically, an in-vehicle communications network, by maintaining a count of each type of error code and a histogram of all network messages seen by each of the controllers during a measurement period; and by determining a bus health index of the communication bus based upon a percentage of a given type of error to the total count of all errors during a measurement period. An individual controller or controller area network bus segment can be indicated as having a communications problem because of the health index.

United States PCT patent application US2012/053725 published on Mar. 13, 2014 to Zhang et al. and is assigned to GM Global Technology Operations LLC. This patent application relates to a controller area network (CAN) that has a plurality of CAN elements including a communication bus and controllers. A method for monitoring the controller area network CAN includes identifying active and inactive controllers based upon signal communications of the communication bus and identifying a candidate fault associated with one of the CAN elements based upon the identified inactive controllers.

U.S. Pat. No. 8,799,738 B2 issued on Aug. 5, 2014 to Emde et al., and is assigned to Robert Bosch GmbH. This patent relates to a method of detecting data transmission errors in a CAN controller including generating at least one check bit that is verifiable for ensuring the consistency of the transmitted data. A CAN controller that ensures continuous error monitoring during data transmission includes an interface unit for exchanging data with a CAN bus, a memory unit for storing received data and data to be transmitted, and an electronic unit for controlling data transmission between the memory unit and the interface unit. The interface unit of the CAN controller has an arrangement for generating check bits for received data and for verifying check bits for data to be transmitted.

U.S. Pat. No. 6,795,941 B2 issued on Sep. 21, 2004 to Nickels and is assigned to Honeywell International Inc. This patent relates to a network having at least one controllable CAN-based sensor device having a microcontroller, a power source and at least one host controller. Preferably, the network is a Smart Distributed System-based network. In this embodiment, each microcontroller communicates with the controller, generating and storing a value in at least one counter when a successful message is transmitted to the controller. When a unsuccessful message is detected by the microcontroller, a counter generates and stores a second or decremented value in the same or different counter. When the sum total value of error messages in the counter reaches a marginal critical value, a message is transmitted to the controller while maintaining the microcontroller's communication with the network. When a counter reaches a critical value, the microcontroller enters a bus off mode and disconnects the sensor device, and thus the microcontroller, from the network.

The prior art approaches and in particular the approaches to monitoring the protocol health of vehicle controller area networks and providing useful protocol health information are deficient.

SUMMARY OF THE INVENTION

The present invention relates to aspects in a mobile device protocol health monitoring system. The present invention provides a system to monitor protocol health, log protocol health data and communicate the logs of protocol health data to a remote system. The system may also take corrective actions based upon specific indications of protocol health. The present invention also provides protocol health indications and corrective actions based upon monitoring and assessing the message transmission rate. The present invention also provides protocol health indications and corrective actions based upon monitoring and assessing for a line disconnect.

According to a first broad aspect of the invention, there is a method of monitoring protocol health in a mobile device network. The method comprises selecting at least one of a message transmission rate monitoring process or a line disconnect monitoring process, monitoring the protocol health based upon the selecting at least one of message transmission rate monitoring process or line disconnect monitoring process and creating a protocol health log.

The method may further comprise when monitoring the protocol health based upon the selecting at least one of a message transmission rate monitoring process or a line disconnect monitoring process, providing an indication to unacceptable protocol health and providing at least one corrective action to a device communicating with the mobile device network.

Providing at least one corrective action either disconnects the device connected to the mobile network or sets the device to a safe mode.

The method may further comprise communicating the protocol health log to a remote system, the remote system receiving the protocol health log and the remote system assessing and displaying an indication of protocol health.

The indication of protocol health includes at least one of a good protocol health, a poor protocol health, a better protocol health, an increasing protocol health, a decreasing protocol health, an acceptable protocol health, an unacceptable protocol health or a severe protocol health.

The message transmission rate monitoring process may further include an initialization process. The initialization process may include a determination of all mobile device network protocols available and selecting an initial address to monitor for each available mobile device network protocol. The initialization process may further include an activation window for the mobile device network to stabilize after activation.

The message transmission rate monitoring process may include a message transmission rate threshold determination process. The message transmission rate threshold determination process may further include monitoring a message transmission rate associated with a selected address, if the message transmission rate is below a lock threshold, select another address and monitor the message transmission rate associated with the select another address, if the data transmission rate is at or above the lock threshold, lock the address and establish a maximum transmission rate threshold. The lock threshold may be set for a slow protocol or the lock threshold may be set for a fast protocol. In an embodiment of the invention the lock threshold for a slow protocol is 10 messages per second. In an embodiment of the invention, the lock threshold for a fast protocol is 50 messages per second.

The transmission rate monitoring process may further include monitoring a message transmission rate associated with a lock address on the mobile device network, comparing a range of the message transmission rate to a maximum message transmission rate threshold and logging a protocol health indication when the transmission rate is within the range. The range may be a first threshold indicating a notify indication. In an embodiment of the invention, the first threshold is between 51% and 60% of the maximum transmission rate threshold. The range may also be a second threshold indicating a warning indication. In an embodiment of the invention, the second threshold is between 40% and 50% of the maximum transmission rate threshold. The range may also be a third threshold indicating a severe indication. In an embodiment of the invention, the third threshold is less than 40% of the maximum transmission rate threshold. If a severe indication is determined beyond a severe indication threshold, then provide a corrective action to a device. In an embodiment of the invention, the severe indication threshold is a multiple occurrence of the severe indication greater than 50 times.

The line disconnect monitoring process further comprises a first process for monitoring the mobile device network and resetting an oscillating error indicator when a message is received. The line disconnect monitoring process may also further comprise a second process for monitoring a mobile device error indicator and incrementing an oscillating indicator upon detecting when the mobile device network error indicator reaches an error threshold. The line disconnect monitoring process may further comprise monitoring a mobile device network error indicator and incrementing an oscillating error indicator upon detecting when the mobile device network error indicator oscillates below the error threshold. The line disconnect monitoring process may further comprise setting a communication safe mode if the oscillating indicator has reached a maximum oscillation threshold. In an embodiment of the invention, the error threshold is 128. In an embodiment of the invention, the maximum oscillation threshold is 10.

The protocol health log may include protocol health data. The protocol health log may also include at least one of message transmission rate data, maximum transmission rate data, number of oscillations or maximum number of oscillations. The protocol health log may also include protocol health indications. Protocol health indications may include at least one of notify, warning and severe.

The initial address and the address to monitor are a high priority address. Corrective action is at least one of an electronic disconnect or physical disconnect or safe mode of operation for the device.

In another broad aspect of the invention, there is a method of monitoring protocol health in a mobile device network. The method comprises monitoring a message transmission rate associated with a lock address on the mobile device network, comparing a range of the transmission rate to at least one maximum transmission rate threshold and logging a protocol health condition when the transmission rate is within the range.

In another broad aspect of the invention, there is a method of monitoring protocol health in a mobile device network. The method comprises a first process and a second process. The first process monitoring the mobile device network and resetting an oscillating error indicator when a message is received. The second process monitoring a mobile device network error indicator, incrementing an oscillating error indicator upon detecting when the mobile device network error indicator reaches a maximum error threshold, incrementing an oscillating indicator upon detecting when the mobile device network error indicator oscillates below an error threshold and setting a safe mode if the oscillating indicator has reached a maximum oscillation threshold. In an embodiment of the invention, the maximum error threshold is 128. In an embodiment of the invention, the maximum oscillation threshold is 10.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematics Communication System

Figure 1:
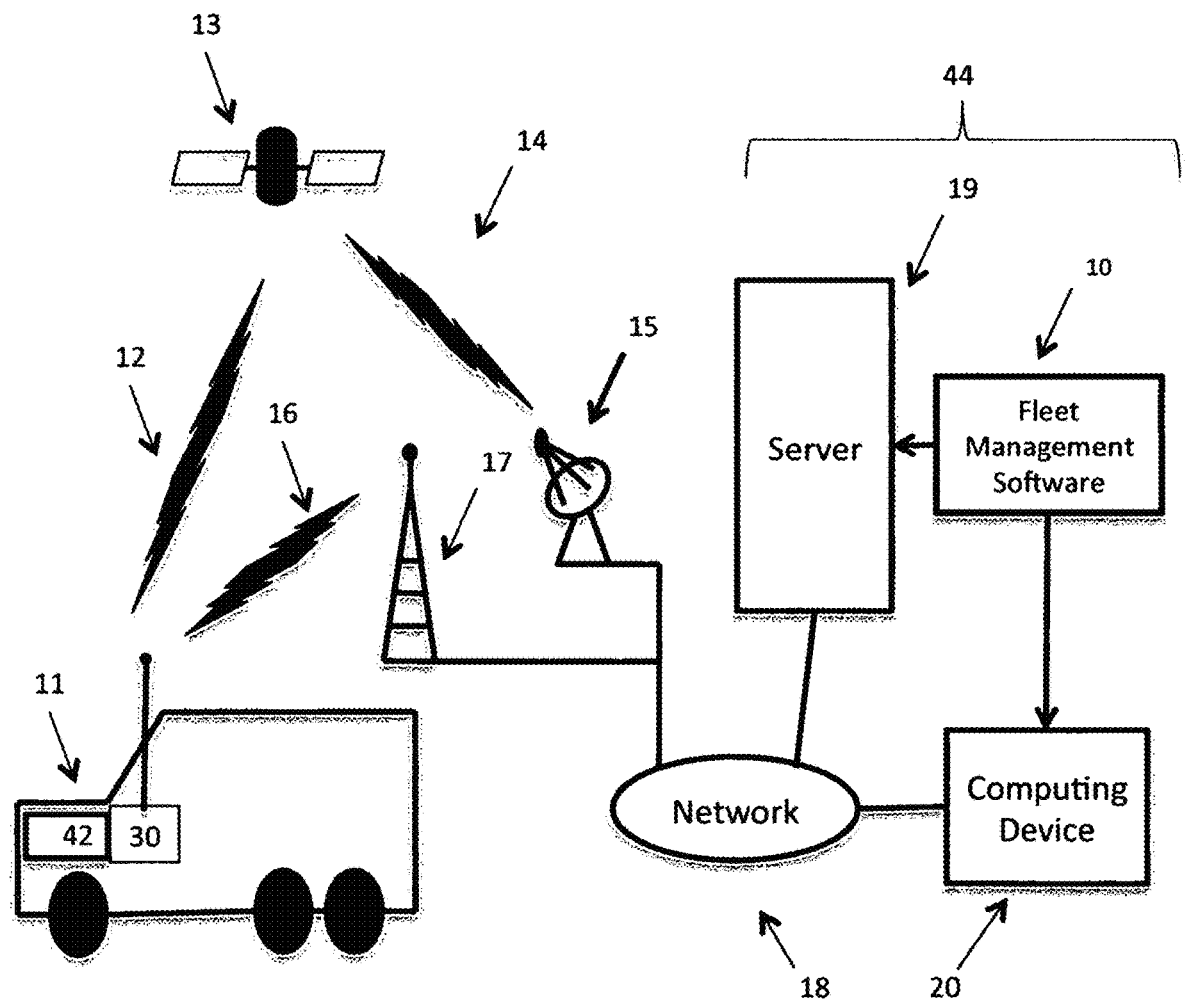
FIG. 1 is a high level diagrammatic view of a mobile device telematics communication system.

Referring to FIG. 1 of the drawings, there is illustrated a high level overview of a telematics communication system. There is at least one mobile device, for example, a vehicle generally indicated at 11. Persons skilled in the art will appreciate other types of mobile devices are within the scope of the invention. The mobile device 11 includes a telemetry hardware system 30 and optionally a resident portion 42.

The telematics communication system provides communication and exchange of data, logs of monitored data, protocol health data, information, commands, and messages between components in the system such as at least one server 19, at least one computing device 20 and at least one mobile device 11. The computing device 20 may be a desktop device or further include other hand held devices or wearable devices.

In one example, the communication 12 is to/from a satellite 13. The mobile device 11 communicates with the satellite 13 that communicates with a ground-based station 15 that communicates with a computer network 18. In an embodiment of the invention, the mobile telemetry hardware system 30 and the remote system 44 (FIG. 1 and FIG. 2) facilitates communication 12 to/from the satellite 13. An example mobile telemetry hardware system 30 is the GEOTAB™ vehicle-tracking device (GO™).

In another example, the communication 16 is to/from a cellular network 17. The mobile device 11, and server 19 or computing device 20 connected to a network 18 communicates over the cellular network 17. In an embodiment of the invention, communication 16 to/from the cellular network 17 is facilitated by the mobile telemetry hardware system 30 and the remote system 44 components.

Computing device 20 and server 19 communicate over the computer network 18. The server 19 may include a database and fleet management software 10 that runs on a server 19. Clients operating a computing device 20 communicate with the application fleet management software 10 running on the server 19 or computing device 20. Alternatively, access to the fleet management software 10 may be provided through cloud computing. An example fleet management software 10 system is the myGEOTAB™ product.

In an embodiment of the invention, data, protocol health data, information, commands, and messages may be sent from the mobile telemetry hardware system 30 to the cellular network 17, to the network 18, and to the server 19. Computing devices 20 may access the data, protocol health data and information on the server 19. Alternatively, data, information, commands, and messages may be sent from the computing device 20 or the server 19, to the network 18, to the cellular network 17, and to the mobile telemetry hardware system 30.

In another embodiment of the invention, data, protocol health data, information, commands, and messages may be sent from mobile telemetry hardware system to the satellite 13, the ground based station 15, the network 18, and to the server 19. Computing devices 20 may access data, protocol health data and information on the server 19. In another embodiment of the invention, data, information, commands, and messages may be sent from the server 19, to the network 18, the ground based station 15, the satellite 13, and to a mobile telemetry hardware system.

In another embodiment of the invention, data, protocol health data, information, commands, and messages may be exchanged between the mobile telemetry hardware system 30 and the computing device 20 over a satellite 13 based network or a cellular network 17. Alternatively, the data, protocol health data, information, commands, and messages may be exchanged between the mobile telemetry hardware system 30 and the server 19 over a satellite 13 based network or a cellular network 17.

Mobile Telemetry Hardware System

Figure 2:
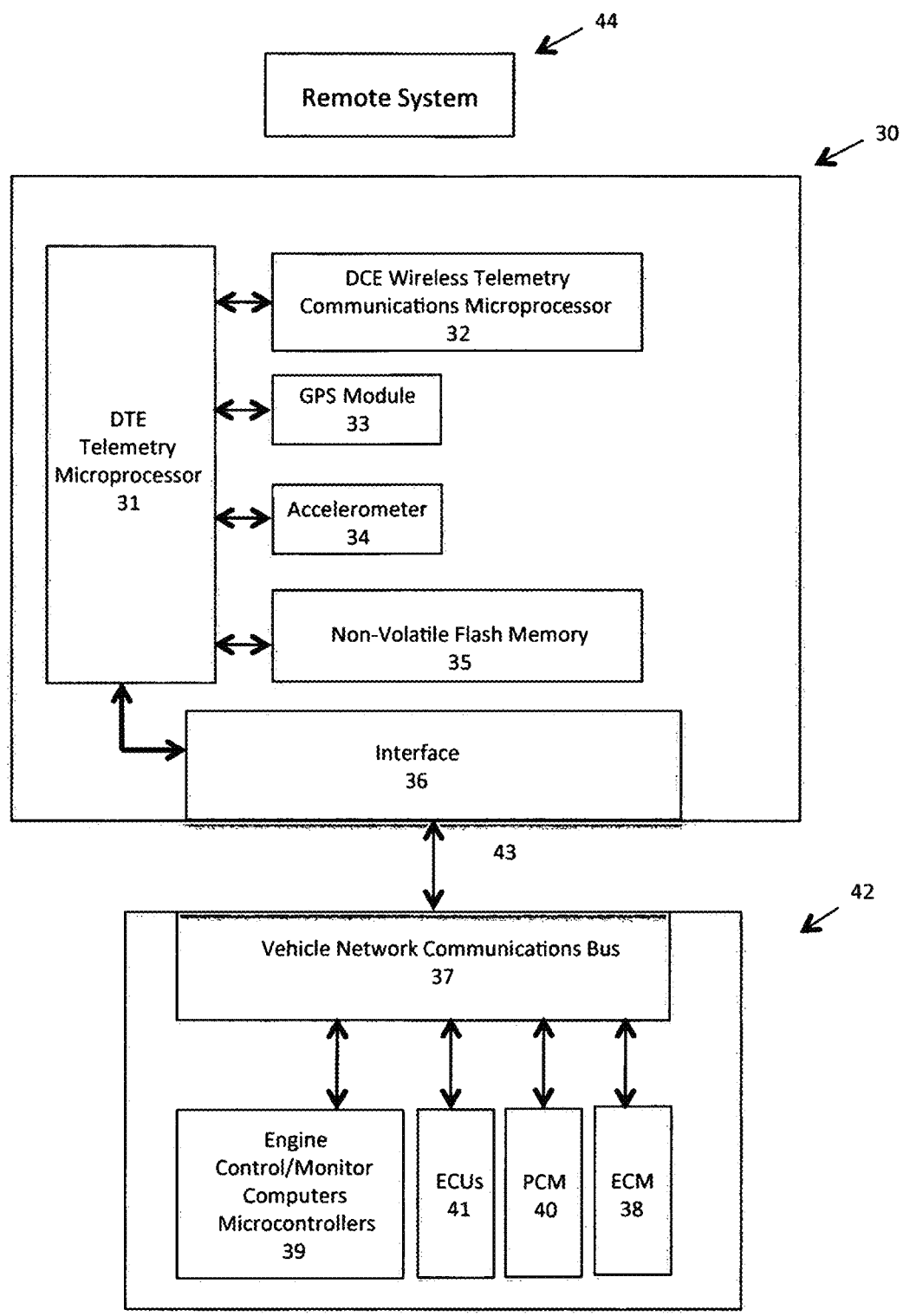
FIG. 2 is diagrammatic view of an mobile telemetry hardware system including an on-board portion and a resident mobile portion.

Referring now to FIG. 2 of the drawings, there is illustrated a mobile telemetry hardware system generally indicated at 30 and a remote system generally indicated at 44. The mobile telemetry hardware system 30 is an example of a device that communicates or connects with a mobile device network. An on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile flash memory 35; and provision for an OBD (on board diagnostics) interface 36 for connection 43 and communication with a vehicle network communications bus 37, or more generally a mobile device network. The mobile device network in an embodiment of the invention is any form or configuration of a vehicle network. In alternative embodiments of the invention, the mobile device network is a controller area network (CAN).

The resident mobile portion 42 generally includes: the vehicle network communications bus 37 and controller area network (CAN); the ECM (electronic control module) 38; the PCM (power train control module) 40; the ECUs (electronic control units) 41; and other engine control/monitor computers and microcontrollers 39.

While the system is described as having an on-board portion 30 and a resident mobile portion 42, it is also understood that the present invention could be a complete resident mobile system or a complete on-board system. In addition, in an embodiment of the invention, a mobile telemetry system includes a mobile system and a remote system 44. The mobile system is the mobile telemetry hardware system 30. The mobile telemetry hardware system 30 is the on-board portion and may include the resident mobile portion 42. In further embodiments of the invention the remote system 44 may be one or all of the server 19, computing device 20, and fleet management software 10.

In an embodiment of the invention, the DTE telemetry microprocessor 31 includes an amount of internal flash memory for storing firmware to operate and control the overall system 30. In addition, the microprocessor 31 and firmware log data, format messages, receive messages, send messages and convert or reformat messages. In an embodiment of the invention, an example of a DTE telemetry microprocessor 31 is a PIC24H microcontroller commercially available from Microchip Corporation.

The DTE telemetry microprocessor 31 interconnects with an external non-volatile flash memory 35. In an embodiment of the invention, an example of the flash memory 35 is a 32 MB non-volatile flash memory store commercially available from Atmel Corporation. The flash memory 35 of the present invention is used for data logging, including protocol health data. Protocol health data includes at least one of, message transmission rate data, maximum message transmission rate data, number of oscillations data, maximum number of oscillation data and protocol health indications.

The DTE telemetry microprocessor 31 interconnects for communication to the GPS module 33. In an embodiment of the invention, an example of the GPS module 33 is a Neo-5 commercially available from u-blox Corporation. The Neo-5 provides GPS receiver capability and functionality to the mobile telemetry hardware system 30. Alternatively, the DTE telemetry microprocessor 31 may interconnect for communication with an external GPS module through an interface (not shown). The GPS module provides position data and speed data to the DTE telemetry microprocessor 31 and non-volatile flash memory 35.

The DTE telemetry microprocessor is further interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and other message and communication information and data from the resident mobile system components for further processing.

As a brief non-limiting example of vehicle data and information, the list may include: vehicle identification number (VIN), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional mobile technology.

The DTE telemetry microprocessor 31 interconnects for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the mobile telemetry hardware system 30 for sending and receiving data to/from a remote system 44. Alternatively, the communication device could be a satellite communication device such as an Iridium™ device interconnected for communication with the DTE telemetry microprocessor 31. Alternatively, there could be a DCE wireless telemetry communications microprocessor 32 and an Iridium™ device for satellite communication. This provides the mobile telemetry hardware system 30 with the capability to communicate with at least one remote system 44.

In embodiments of the invention, a remote system 44 could be another computing device 20 disposed with a vehicle 11 or a base station or other computing device (not shown). The base station may include one or more servers 19 and one or more computers 20 connected through a computer network 18 (see FIG. 1). In addition, the base station may include fleet management application software 10 for data acquisition, analysis, and sending/receiving commands or messages to/from the mobile telemetry hardware system 30.

The DTE telemetry microprocessor 31 interconnects for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full-scale range of +−2 g and +−8 g, programmable thresholds, and is capable of measuring accelerations with an output data rate of 100 Hz or 400 Hz.

Alternatively, the mobile device 30 may not include an integral GPS module 33 or may not include a DCE wireless telemetry communications processor 32. With this alternative embodiment of the mobile device 30, an I/O expander (not shown) provides an interface between the DTE telemetry microprocessor 31 and an external GPS module 33 or a DCE wireless telemetry communications processor 32.

The mobile telemetry hardware system 30 receives data and information from the resident mobile portion 42, the GPS module 33, and the accelerometer 43. The data and information is stored in non-volatile flash memory 35 as a data log. The data log may be transmitted by the mobile telemetry hardware system 30 over the mobile telemetry communication system to the server 19 or computing device 20 (see FIG. 1). The transmission may be controlled and set by the mobile telemetry hardware system 30 at pre-defined intervals or aperiodic intervals. The transmission may also be triggered because of an event such as a harsh event or an accident or a protocol health indication such as a severe protocol health indication. The transmission may further be requested by a command sent from the application software running on the server 19.

The DTE telemetry microprocessor 31 and non-volatile flash memory 35 are a portion of a device apparatus to store and execute the firmware, logic 50, 70, 80, 90, 100, associated data and protocol health data for mobile device protocol health monitoring (see FIG. 3, FIG. 5, FIG. 6, FIG. 7 and FIG. 8). The DCE wireless telemetry communications microprocessor 32 provides the communication capability to send logs of monitored data and protocol health data to a remote system 44.

The remote system 44 components (server 19, computing device 20, microprocessors and memory) provide an apparatus to access the fleet management software 10. The fleet management software 10 stores and executes the logic 60 and associated data and protocol health data for the remote system 44 (see FIG. 4) to assess and provide an indication to the quality of protocol health.

Mobile Device Protocol Health Monitoring System

The protocol health monitoring system of the present invention is described with reference to FIG. 3 and FIG. 4. Protocol health of a mobile device relates to the ability to send and receive messages between devices communicating with or connected to the mobile device network. There is an amount of normal interference with the mobile device network that impedes sending and receiving messages. However, when this interference becomes high, or there are other issues such as devices interfering with the mobile device network or loading the mobile device network, or physical line and cable disconnections, communication of messages on the mobile device network can be intermittent or impossible.

The protocol health monitoring system receives data and information from various protocol layers including but not limited to J1979, J1939, J1708 and J1850. This information is monitored and processed to determine the protocol health quality of the connection to the mobile device network. There are many consequences when the connection becomes intermittent. For example, when a message is discarded due to an invalid acknowledgement message, the transmitting device will then be forced to re-transmit the discarded message. This increases network traffic at the expense of other devices attempting to communicate over the network. An intermittent connection can also prevent a device from detecting when the network is active creating a higher probability that an arbitration algorithm will be violated. This can cause messages between ECUs 41 to be lost. If an intermittent connection occurs while a device is sending a message, other devices may receive an incomplete message and report a communication error. This communication error may cause other problems such as activating a check engine light or reducing engine performance.

Mobile device protocol health monitoring provides the ability to monitor a mobile device network, assess the mobile device network, provide protocol health indications in the form of a log of data and take the necessary corrective action to prevent a device communicating or connected to the mobile device network from impeding communication.

Figure 3:
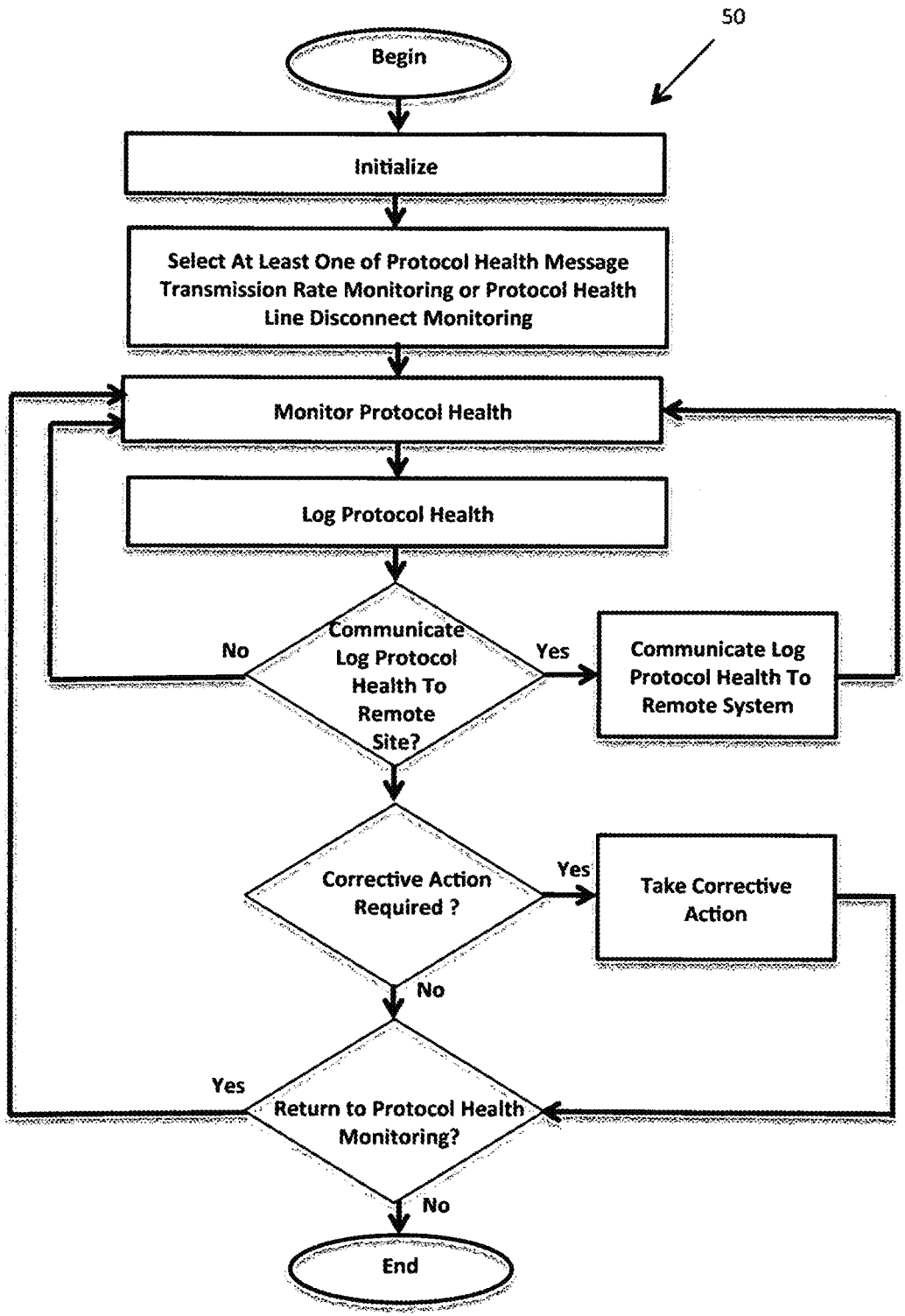
FIG. 3 illustrates system logic associated with a mobile device for protocol health monitoring.
Figure 4:
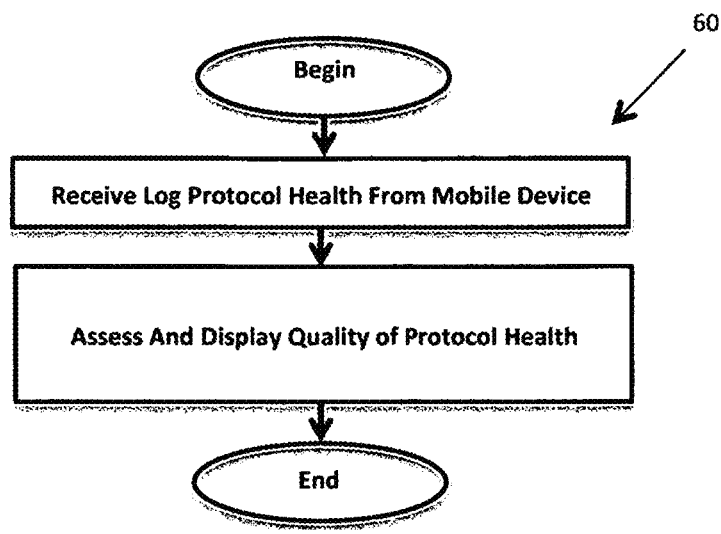
FIG. 4 illustrates system logic associated with a remote system for protocol health monitoring.

The process for mobile device network protocol health monitoring with a hardware device such as a telemetry hardware system 30 is generally indicated at 50 in FIG. 3. The logic begins with initializing parameters and thresholds. In embodiments of the invention, a maximum message transmission rate threshold is established, a lock threshold is established, a series of thresholds relating to a series of protocol health indications, an oscillating error indictor, oscillating indicator, a maximum oscillation threshold are initialized and lock addresses are determined. Initialization may be internal to the telemetry hardware system 30 or based upon receipt of initialization messages from the remote system 44.

Protocol health monitoring is accomplished through two different approaches to monitoring. A first approach is protocol health message transmission rate monitoring. A second approach is protocol health line disconnect monitoring. A third approach is a combination of the first and second approach. For the third approach, the protocol health message transmission rate monitoring process and the protocol health line disconnect monitoring process operate cooperatively for example concurrently or in parallel.

The logic selects at least one of protocol health message transmission rate monitoring or protocol health line disconnect monitoring and then begins to monitor messages or errors on the mobile device network. The results of monitoring the mobile device network are stored as protocol health data points in a protocol health log. In an embodiment of the invention, the data points in the protocol health log are associated with time stamps.

The protocol health data points in the protocol health log provide information concerning the protocol health of the mobile device network. In an embodiment of the invention, this information includes at least one indication such as notify, warning or severe. In another embodiment of the invention, the information includes at least one transmission rate for each locked address, maximum message transmission rates, number of oscillations and maximum number of oscillations.

The number of protocol health data points in the protocol health log may be also reduced by a simplification process. Persons skilled in the art will appreciate there are a number of different approaches to reduce the number of data points representative of message transmission rates such as the Ramer Douglas Peucker approach, Douglas Peucker approach, iterative end point fit approaches, polyline reductions and split and merge approaches. In an embodiment of the invention, a Ramer Douglas Peucker approach is applied to reduce the number of transmission rate data points. For an embodiment of the invention, the allowable error is 20% of the maximum transmission rate threshold. A specific data point is logged when the predicted value and the actual value differ by 20%.

The protocol health log is communicated to a remote system 44 and may be based upon periods or time, triggers, for example a severe indication, or aperiodic periods of time or requests from the remote system 44. Communication of the protocol health log continues over time sending multiple logs to a remote system 44 over the course of a mobile device 11 journey.

Additionally, the mobile device protocol health monitoring system may take corrective action dependent upon the quality of the protocol health. A first corrective action places a device communicating or connected to the mobile device network into a safe mode. A second corrective action electronically disconnects the device from the mobile device network. A third corrective action provides a signal to an operator to physically disconnect the device from the mobile device network. This signal may be a visual indication on a display or an audio indication. This signal may be presented to a person or operator of a mobile device 11. This signal may also be presented to a person or operator remotely monitoring the mobile device 11.

Mobile device network protocol health monitoring continues with receipt of the protocol health log at the remote system 44. This is generally indicated at 60 in FIG. 4. The data points associated with a single protocol health log or a sequence of protocol health logs can be assessed and analyzed to display aspects of protocol health. In embodiments of the invention, this may occur on at least one of server(s) 19, computing device(s) 20 or fleet management software 10. Receipt of a current protocol health log provides an instantaneous indicator to the mobile device network protocol health and may include protocol health indications indications (notify, warning, severe) or alternatively protocol health data (message transmission rate data, maximum message transmission rate data, number of oscillations data and maximum number of oscillations data). A severe indication can immediately trigger and send a notification to an operator. Alternatively, protocol health can also be associated with logs of other vehicle data for cause analysis.

Multiple protocol health logs over time reveal trends relating to the quality of protocol heath or multiple journeys of the mobile device 11. Trends include increasing protocol health, decreasing protocol health, acceptable levels of protocol health, unacceptable levels of protocol health. Alternatively, protocol health can be associated with particular makes or models or particular years of mobile devices 11 as well as particular options associated with a mobile device 11 to determine or identify particular equipment or options potentially causing poor or unacceptable protocol health.

Protocol Health Message Transmission Rate Monitoring

Figure 5:
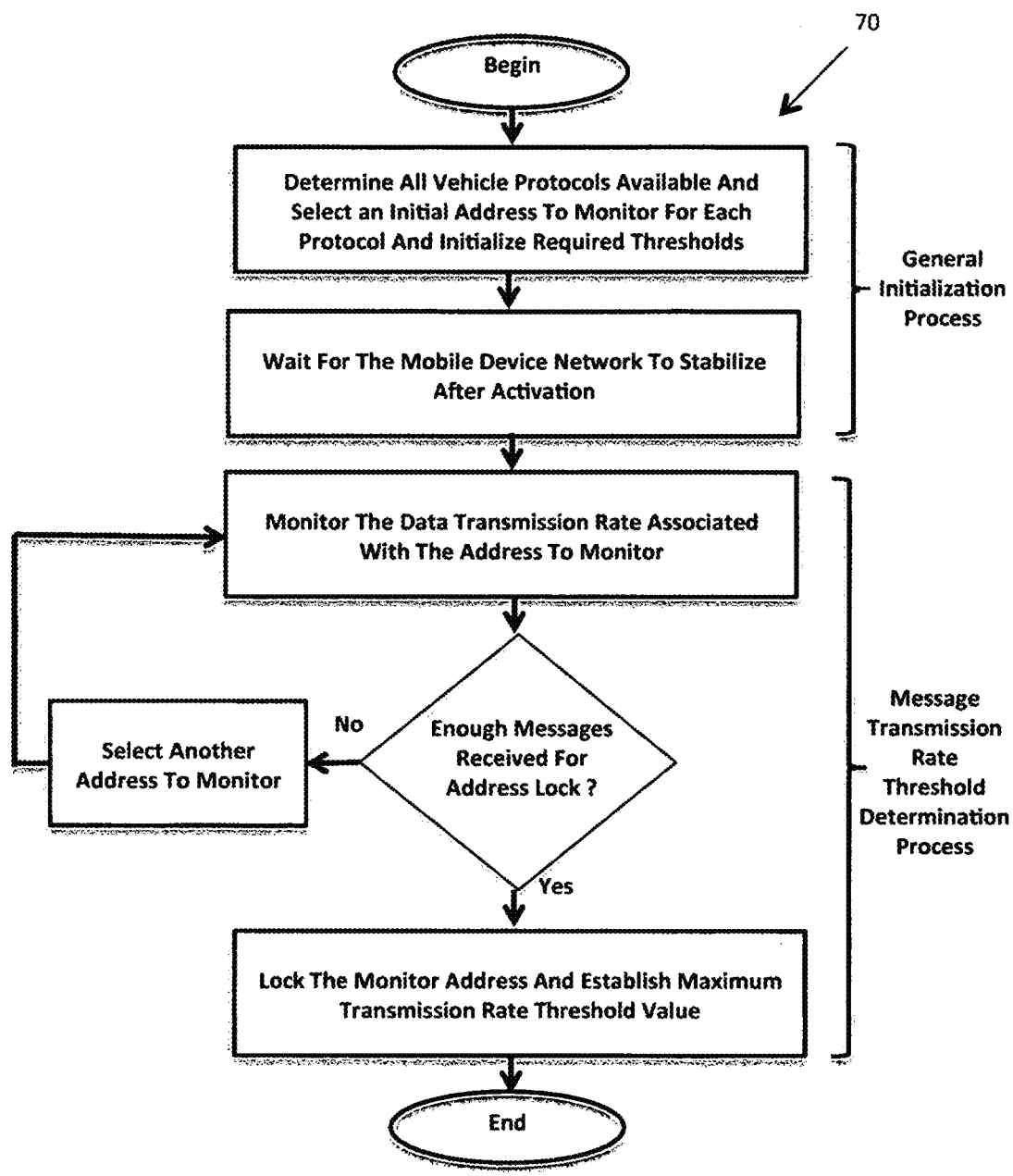
FIG. 5 illustrates the logic associated with a mobile device for protocol health initialization process when monitoring message transmission rates.
Figure 6:
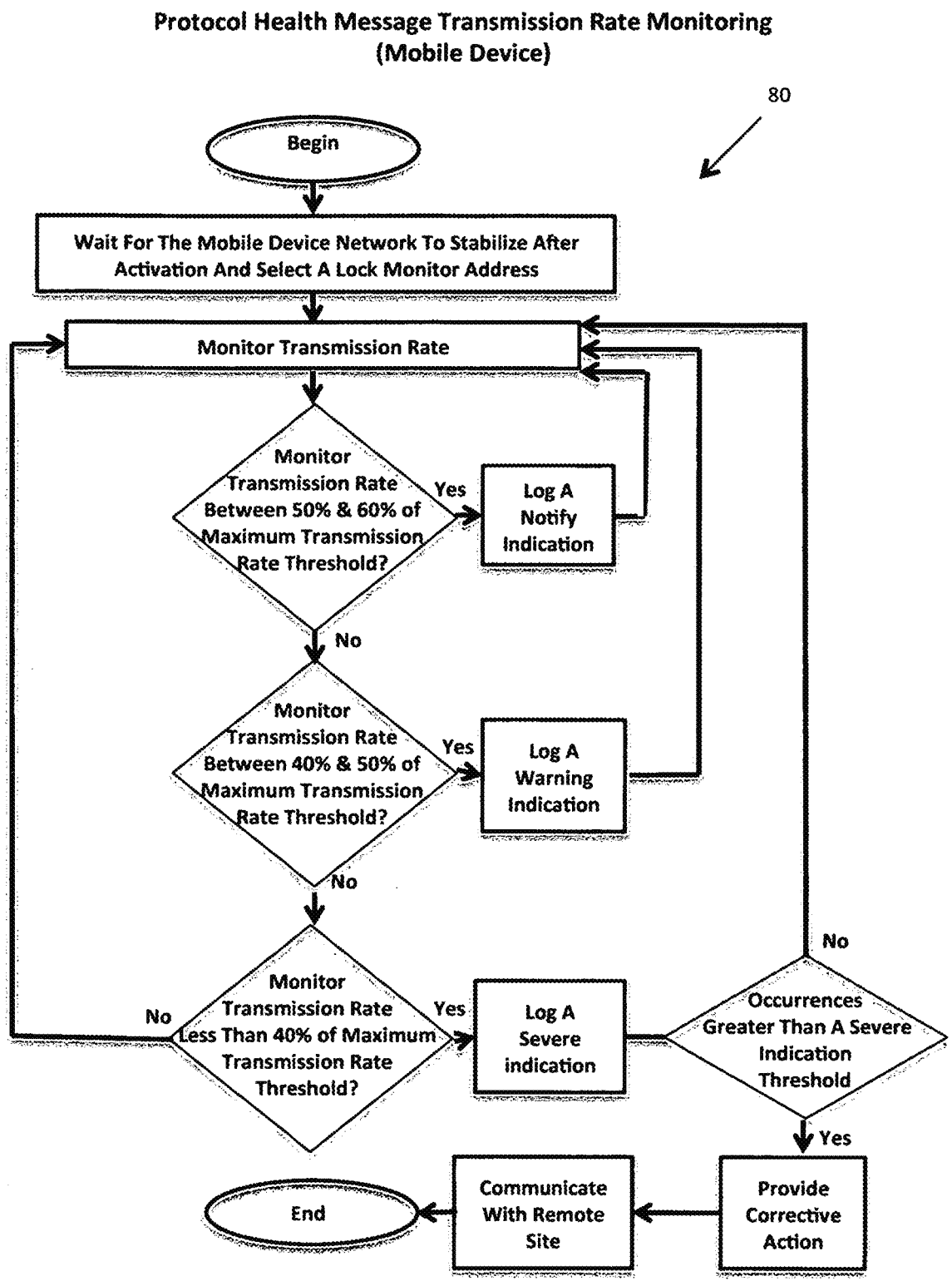
FIG. 6 illustrates the logic associated with a mobile device for protocol health message transmission rate monitoring process.

Protocol health message transmission rate monitoring of the present invention is described with reference to FIG. 5 and FIG. 6. Initialization is generally indicated at 70 in FIG. 5 and monitoring in generally indicated at 80 in FIG. 6.

Initialization of the protocol health message transmission rate monitoring process has a general initialization process and a message transmission rate threshold determination process. The general initialization process has two parts that are not order or sequence dependent. The first part is to determine all the vehicle protocols available to the controller area network and select an initial address to monitor for each of the available vehicle protocols. In an embodiment of the invention, the initial address is the lowest available address. This accommodates mobile device networks that utilize an arbitration process where the lowest address typically has the highest priority. This provides the most reliable address for monitoring and determining protocol health. Examples include the data layer found in the SAE specifications of J1979, J1939, J1708 and J1850. In an embodiment of the invention, the logic of the first part is performed by the device (telemetry hardware system 30) associated with the mobile device 11. Alternatively, the logic may be performed by a remote site 44 and communicated as a message to the device associated with the mobile device 11. Selecting the initial address to monitor for each protocol is based upon an address that will have a relatively high number of communication messages during activation and operation of the mobile device network. This varies to some degree between vehicle protocols.

Initialization also involves setting or establishing a number of different threshold parameters. There is at least one threshold associated with at least one protocol health indication. In an embodiment of the invention, a first threshold is associated with a first protocol health indication. The first threshold is between 51% and 60% of a maximum transmission rate threshold for the first protocol health indication of notify. In an embodiment of the invention, a second threshold is associated with a second protocol health indication. The second threshold is between 40% and 50% of a maximum transmission rate threshold for the second protocol health indication of warning. In an embodiment of the invention, a third threshold is associated with a third protocol health indication. The third threshold is less than 40% of a maximum transmission rate threshold for a third protocol health indication of severe.

Initialization also involves setting or establishing a severe indication threshold or limit. In an embodiment of the invention, the severe indication threshold is 50 occurrences of a severe protocol health indication.

Initialization also involves setting or establishing at least one lock threshold. In an embodiment of the invention, a lock threshold for a slow mobile device network protocol is 10 messages per second. In an embodiment of the invention, a second lock threshold for a fast mobile device network protocol is 50 messages per second. An example slow mobile device network protocol is protocols that are less than 100 kbps (kilobits per second) and an example fast mobile device network protocol is protocols that are faster than 100 kbps.

The second part of the general initialization process includes an activation window that waits for the mobile device network to stabilize after activation. In an embodiment of the invention, this time delay is 30 seconds.

Once the general initialization process is complete, the message transmission rate threshold determination process begins. The data transmission rate associated with an address to monitor is monitored to determine a count of messages for a defined period of time. In an embodiment of the invention, this defined period of time is 1 second and the first or initial address is the lowest address. Alternatively, the first or initial address in an address with the highest priority. The count of messages is compared with a lock threshold. If the count of messages is less than the lock threshold, then another address to monitor is selected and the message transmission rate threshold determination process repeats with another address (incremented in sequence from the initial address) to monitor. This process repeats for all initial addresses and selected additional addresses for each vehicle protocol. When the count of messages is greater than the lock threshold, then the lock address is established and the count of messages associated with this lock address establishes the maximum transmission rate threshold messages over time. At completion of the message transmission rate threshold determination process, at least one lock address and at least one maximum transmission rate threshold value has been determined and saved for each vehicle protocol.

Once initialization is complete, the protocol health message transmission rate monitoring process may begin. Optionally, the process may need to wait for the controller area network to stabilize after activation, for example, when the vehicle ignition is activated. This is an activation window. In an embodiment of the invention, the wait time is 35 seconds.

Next, a lock address to monitor is selected and the transmission rate of messages corresponding to the selected lock address is monitored over a period of time. In an embodiment of the invention, the period of time is 1 second. This determines a count of messages per second for the selected lock address.

The monitored transmission rate of messages is then compared to the maximum transmission rate threshold associated with the lock address. If the transmission rate of messages reaches a range when compared to the maximum transmission rate threshold, then a condition is logged and the process repeats by continuing to monitor the transmission rate for the selected lock address. This process also repeats for each lock address selected to monitor and may run cooperatively for multiple lock addresses.

In an embodiment of the invention, there are three ranges of transmission rates and three different types of protocol health indications that may be logged as they relate to mobile device network protocol health. For each occurrence when the monitored transmission rate is between 51% and 60% of the maximum transmission rate threshold, then a notify indication is logged as a first indication of protocol health. For each occurrence when the monitored transmission rate is between 40% and 50% of the maximum transmission rate threshold, then a warning indication is logged as a second indication of protocol health. For each occurrence when the monitored transmission rate is less than 40% of the maximum transmission rate threshold, then a severe indication is logged as an third indication of protocol health.

In addition to providing a log of protocol health indications representative of protocol health, the severe indication may be further monitored and assessed. Each occurrence of a severe indication is counted as a running log of severe indications. If the running log of severe indications is less than a severe indication threshold, then the process continues to monitor transmission rates. If the running log of severe indications is greater than or equal to the severe indication threshold, then the device communicating or connected to the mobile device network is disconnected. Disconnecting the device communicating or connected to the mobile device network may be an electronic disconnect or a physical disconnect. Disconnecting a device is a first type of corrective action. This first type of corrective action is communicated to the remote site 44. In an embodiment of the invention, the severe indication threshold is 50 occurrences.

Upon deactivation of a mobile device 11, for example with a shut down or ignition off in the case of a vehicle, there is a deactivation window. This deactivation window is similar to the activation window, except that it exists at the end of the mobile device 11 journey. In an embodiment of the invention, the deactivation window is 35 seconds. This deactivation window period of time is excluded from being marked as a protocol health indication (notification, warning or severe), but is still included in the simplification process.

Protocol Health Line Disconnect Monitoring

Figure 7:
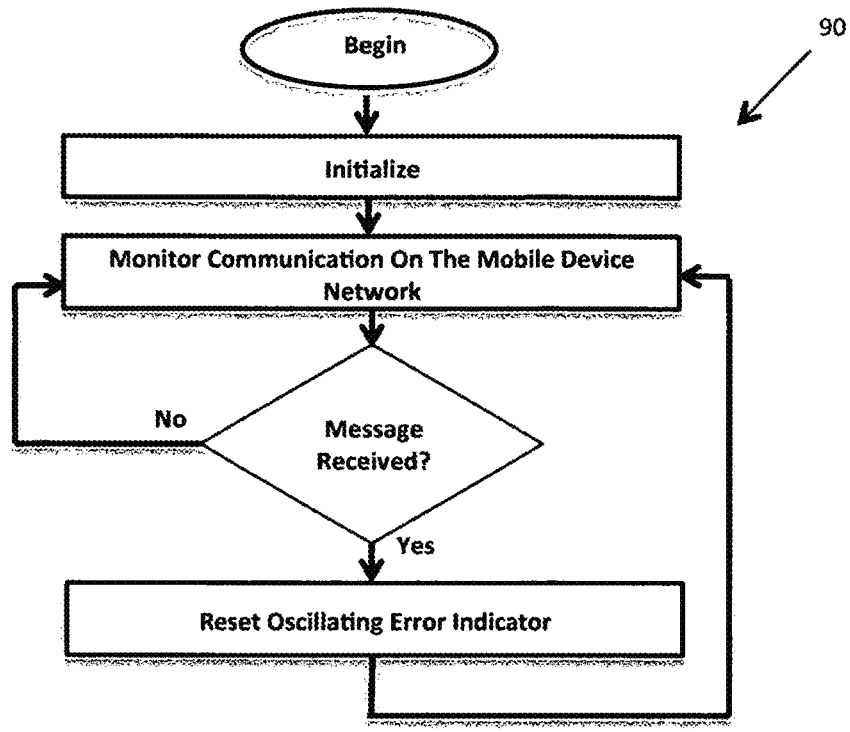
FIG. 7 illustrates the logic for a process associated with a mobile device for protocol health line disconnect monitoring.
Figure 8:
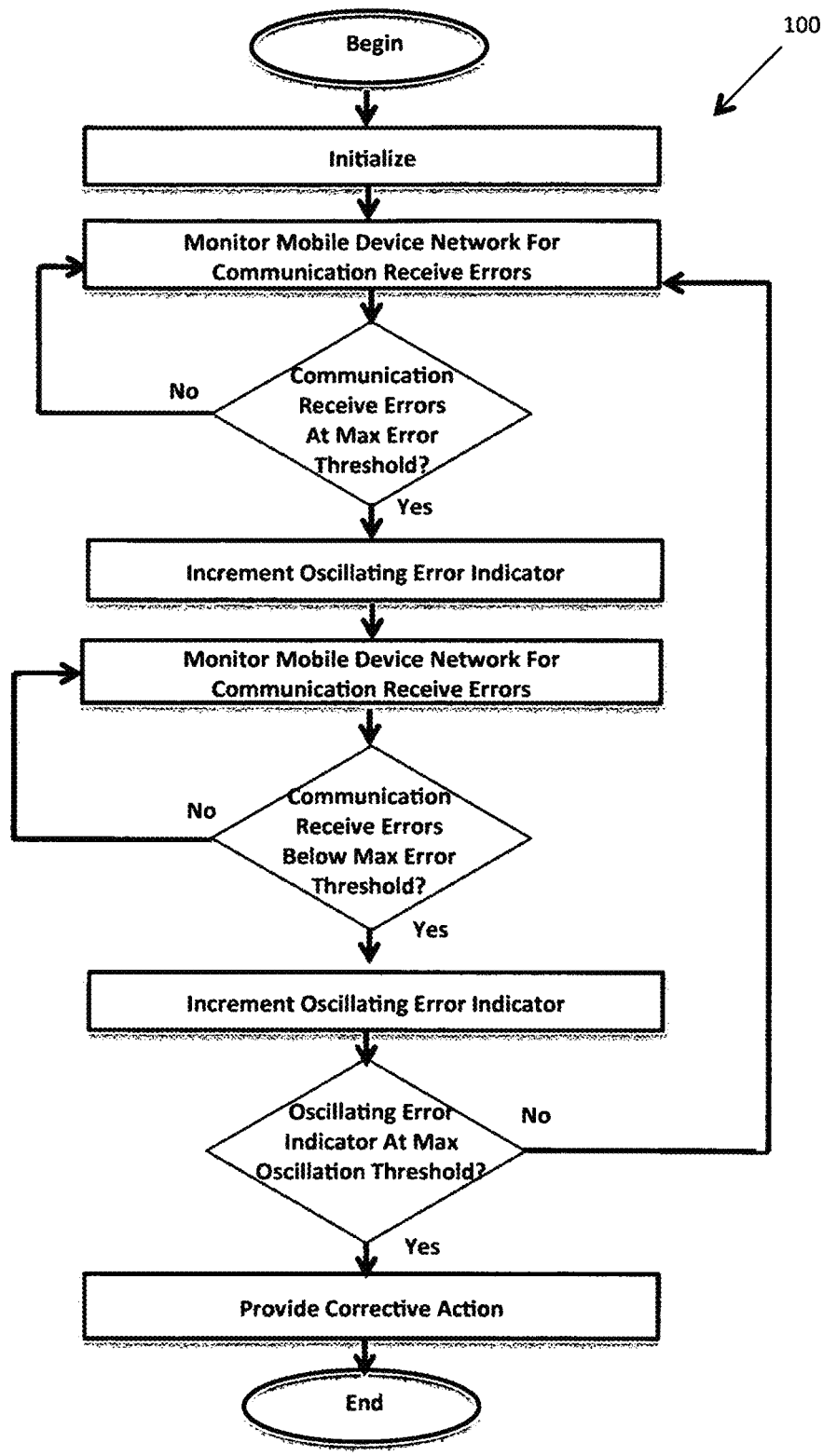
FIG. 8 illustrates the logic for another process associated with a mobile device for protocol health line disconnect monitoring.

Protocol health line disconnect monitoring of the present invention is described with reference to FIG. 7 and FIG. 8. A first line disconnect monitoring process is generally indicated at 90 in FIG. 7 and a second line disconnect monitoring process is generally indicated at 100 in FIG. 8. The first and second processes operate cooperatively, for example concurrently or in parallel.

Oscillation in the present invention is a condition wherein a mobile device network error indicator oscillates up and down constantly. Normally, the mobile device network error indicator decreases every time a message is received. This is accomplished automatically by a microcontroller. During oscillation, the mobile device network error indicator oscillates between a maximum value and one less than a maximum value without receiving a message. In an embodiment of the invention this is between a maximum of 128 and 127 receive errors. This oscillation condition is indicative or a mobile device network error or line disconnect.

The first process may optionally need to initialize an error indicator to zero. Then, the first process monitors the mobile device network communication to detect if mobile device network messages are received. If mobile device network messages are not received, the mobile device network is monitored for messages. If a mobile device network message is received, then the oscillating error indicator is reset to zero.

The second process may also optionally require initialization to initialize the maximum oscillation threshold and to reset the oscillating error indicator. In an embodiment of the invention, the maximum error threshold is set to 128 receive errors, the maximum oscillation threshold is set to 10 occurrences of osculation. In an embodiment of the invention, the oscillating error indicator is a Rx error counter in a controller area network (CAN) controller microprocessor.

The second process monitors the mobile device network for communication receive errors. If the number of communication receive errors are not at the maximum error threshold, then monitoring of the mobile device network continues. If the number of communication receive errors reach the maximum error threshold, then increment an oscillating error indicator and continue with monitoring the mobile device network for communication errors. If the number of communication receive errors oscillates below the maximum error threshold, then increment the oscillating error indicator. If the oscillating error indicator is below the maximum oscillation threshold, then continue back to the first monitoring of the mobile device network for communication receive errors. If the oscillating error indicator has reached the maximum oscillation threshold, then provide corrective action and terminate the protocol health line disconnect monitoring process. In an embodiment of the invention the corrective action is a third corrective action that places the device communication or connected to the controller area network into a safe mode for monitoring.

Technical Effects

Embodiments of the present invention provide one or more technical effects. More specifically, an ability to determine the protocol health of a mobile device network. The protocol health of the mobile device network may be determined by a message transmission rate monitoring apparatus and process. The protocol health of the mobile network may also be determined by a line disconnect monitoring apparatus and process. Another ability is to determine a range of protocol health such as notify, warning and severe. Another ability is to communicate the mobile device network protocol heath to a remote system. The ability to take a first corrective action in the case of a severe protocol health. The first corrective action may be to electronically or physically disconnect a device communicating or connected to a mobile device network. A second corrective action may also be to place the device communicating or connected to a controller area network into a safe mode. Another ability is to assess and display the mobile device network protocol heath at a remote site 44 or a remote device. An ability to provide an alert to a remote site 44 or operator of a mobile device 11 for an indication of a severe protocol health. The alert to an operator prompts the operator to physically disconnect or uninstall the device communicating or connected to the mobile device network.

The description of present invention is with respect to the disclosed non-limiting embodiments and persons skilled in the art understand that the invention is not limited to the disclosed non-limiting embodiments. Persons skilled in the art further understand that the disclosed invention intends to cover various modifications and equivalent arrangements included within the scope of the appended claims. Thus, the present invention is not limited by any of the described non-limiting embodiments.

What is claimed is:

1. A method comprising:
monitoring protocol health in a mobile device network, the protocol health indicating an ability of devices to communicate via the mobile device network and/or a level of interference in the mobile device network, the monitoring comprising monitoring a message transmission rate in the mobile device network, wherein monitoring the message transmission rate comprises:
determining a message transmission rate threshold for the mobile device network, wherein determining the message transmission rate threshold comprises:
iteratively selecting devices in the mobile device network and monitoring each selected device until a device is identified that is communicating via the mobile device network at a transmission rate that is more than a threshold rate, and
in response to identifying in the iteratively selecting and monitoring a device communicating at a transmission rate that is more than the threshold rate, setting the identified device as a monitored device and setting the transmission rate of the monitored device as the message transmission rate threshold for the mobile device network.

2. A method as in claim 1, further comprising:
in response to determining that the protocol health at a time satisfies one or more criteria associated with unacceptable protocol health, providing an indication of unacceptable protocol health and triggering performance of at least one corrective action regarding at least one device communicating with said mobile device network.

3. A method as in claim 2, wherein said triggering performance of the at least one corrective action comprises precluding one or more of said at least one device from communicating via said mobile device network and/or triggering one or more of said at least one device to enter a safe mode.

4. A method as in claim 1, further comprising:
communicating a protocol health log to a remote system, wherein said remote system is configured to, in response to receiving said protocol health log, generate an indication of the protocol health in the mobile device network.

5. A method as in claim 4, further comprising:
generating, with said remote system, the indication of the protocol health, wherein generating said indication of said protocol health comprises generating an indicator including at least one protocol health indication from a group consisting of a good protocol health, a poor protocol health, a better protocol health, an increasing protocol health, a decreasing protocol health, an acceptable protocol health, an unacceptable protocol health, or a severe protocol health.

6. A method as in claim 1, wherein:
monitoring the protocol health in the mobile device network comprises monitoring a protocol health for each of a plurality of protocols;
determining the message transmission rate threshold comprises determining a message transmission rate threshold for each of the plurality of protocols; and
determining the message transmission rate threshold for each of the plurality of protocols comprises, for each protocol, repeating the iteratively selecting devices, the monitoring each selected device, the setting the identified device as the monitored device, and the setting the transmission rate of the monitored device as the message transmission rate threshold, for each protocol of the plurality of protocols, to determine a monitored device and a message transmission rate threshold for each protocol.

7. A method as in claim 6, wherein determining the message transmission rate threshold comprises determining the message transmission rate threshold after a period of time following a start of exchange of communications via said mobile device network.

8. A method as in claim 6, further comprising:
determining a threshold rate, for use in selecting the monitored device, for each protocol.

9. A method as in claim 8, wherein determining the threshold rate for each protocol comprises selecting, for each protocol and based on the protocol, between a first threshold rate or a second threshold rate, the first threshold rate being faster than the second threshold rate.

10. A method as in claim 1, wherein monitoring said message transmission rate in the mobile device network comprises, following setting of the message transmission rate threshold:
monitoring a message transmission rate of the monitored device on said mobile device network,
comparing a range of said message transmission rate of the monitored device to the message transmission rate threshold, and
logging a protocol health indication based on a result of the comparing.

11. A method as in claim 10, wherein logging the protocol health indication comprises, when the result of the comparing indicates said range is above a first threshold, indicating that a notification should be sent regarding the protocol health.

12. A method as in claim 11, wherein said first threshold is between 51% and 60% of said message transmission rate threshold.

13. A method as in claim 11, wherein logging the protocol health indication comprises, when the result of the comparing indicates said range is below the first threshold and above a second threshold, indicating that a warning should be sent regarding the protocol health.

14. A method as in claim 13, wherein said second threshold is between 40% and 50% of said message transmission rate threshold.

15. A method as in claim 13, wherein logging the protocol health indication comprises, when the result of the comparing indicates said range is below a third threshold, indicating that a notification of severe protocol health should be sent.

16. A method as in claim 15, wherein said third threshold is less than 40% of said message transmission rate threshold.

17. A method as in claim 15, further comprising, in response to determining that a repeated result of the comparing over time indicates said range is repeatedly below the third threshold, triggering performance of a corrective action regarding at least one device communicating with the mobile device network.

18. A method as in claim 17, wherein determining that the repeated result of the comparing over time indicates said range is repeatedly below the third threshold comprises determining that the result of the comparing has determined that the range is below the third threshold greater than 50 times.

19. A method as in claim 17, wherein triggering performance of said corrective action comprises triggering disconnection of a device.

20. A method as in claim 1, further comprising:
monitoring communication errors in the mobile device network over time, wherein monitoring the communication errors comprises monitoring for oscillation in occurrence of errors in the mobile device network.

21. A method as in claim 20, wherein monitoring for oscillation comprises:
incrementing an oscillating error indicator in response to detecting that a number of communication errors in the mobile device network oscillates with respect to an error threshold.

22. A method as in claim 21, wherein monitoring communication errors further comprises in response to determining that the oscillating error indicator has reached an oscillation threshold, triggering performance of at least one corrective action.

23. A method as in claim 22, wherein triggering performance of at least one corrective action comprises setting one or more devices to a communication safe mode.

24. A method as in claim 22, wherein said oscillation threshold is 10.

25. A method as in claim 21, wherein said error threshold is 128.

26. A method as in claim 1, wherein monitoring the protocol health further comprises:
   comparing, over time, a message transmission rate of the monitored device to the message transmission rate threshold; and
   maintaining a protocol health log indicating results of the comparing over time.

27. A method as in claim 26, wherein said protocol health log includes protocol health data.

28. A method as in claim 27, wherein said protocol health log includes at least one of message transmission rate data, maximum transmission rate data, number of oscillations or maximum number of oscillations.

29. A method as claim 26, wherein said protocol health log includes protocol health indications.

30. A method as in claim 1, wherein iteratively selecting devices comprises initially selecting a selected address associated with a high priority.

31. A method comprising:
   monitoring protocol health in a mobile device network the protocol health indicating an ability of devices to communicate via the mobile device network and/or a level of interference in the mobile device network, the monitoring comprising monitoring a message transmission rate in the mobile device network, wherein monitoring the message transmission rate comprises:
      selecting a monitored device and setting a transmission rate of the monitored device as a message transmission rate threshold, wherein the selecting and setting comprises:
         repeating acts of monitoring a message transmission rate associated with a selected address, and in response to determining that the message transmission rate is below a threshold rate, selecting another address, until the message transmission rate associated with the selected address is determined to be above the threshold rate, and
         in response to identifying in the repeating acts of monitoring that the message transmission rate associated with the selected address is above the threshold rate, setting a device associated with the selected address as the monitored device, and setting the message transmission rate associated with said selected address as the message transmission rate threshold;
      comparing a range of said message transmission rate for the monitored device to the message transmission rate threshold; and
      logging a protocol health condition based on a result of the comparing of said message transmission rate threshold to said range.

32. A method as in claim 31, wherein logging the protocol health condition comprises, when said range is above a first threshold, logging that a notification should be sent regarding the protocol health.

33. A method as in claim 32, wherein said first threshold is between 51% and 60% of said message transmission rate threshold.

34. A method as in claim 32, wherein logging the protocol health condition comprises, when said range is below the first threshold and above a second threshold, logging that a warning should be sent regarding the protocol health.

35. A method as in claim 34, wherein said second threshold is between 40% and 50% of said message transmission rate threshold.

36. A method as in claim 34, wherein logging the protocol health condition comprises, when said range is below a third threshold, logging that a notification of severe protocol health should be sent.

37. A method as in claim 36, wherein said third threshold is less than 40% of said message transmission rate threshold.

38. A method as in claim 36, further comprising, in response to determining that a severe protocol health condition is met, triggering performance of at least one corrective action.

39. A method as in claim 38, wherein determining that the severe protocol health condition is met comprises determining that the range has been determining to be below the third threshold more than a number of times.

40. A method as in claim 31, wherein:
   monitoring the protocol health in the mobile device network comprises monitoring a protocol health for each of a plurality of protocols;
   setting the message transmission rate threshold comprises setting a message transmission rate threshold for each of the plurality of protocols; and
   setting the message transmission rate threshold for each of the plurality of protocols comprises repeating, for each protocol, the acts of the repeating acts of the monitoring and the setting the message transmission rate as the message transmission rate threshold, and the setting the device as the monitored device, for each protocol of the plurality of protocols, so as to determine a monitored device and a message transmission rate threshold for each protocol.

41. A method as in claim 40, wherein setting the message transmission rate threshold comprises setting the message transmission rate threshold after a period of time following a start of exchange of communications via the mobile device network.

42. A method as in claim 40, further comprising:
   determining a threshold rate, for use in selecting the monitored device, for each protocol.

43. A method as in claim 42, wherein determining the threshold rate for each protocol comprises selecting, for each protocol and based on the protocol, between a first threshold rate or a second threshold rate, the first threshold rate being faster than the second threshold rate.

44. A method as in claim 31, wherein repeating the acts of monitoring and selecting comprises initially selecting an address associated with a high priority.

* * * * *